US012378813B2

(12) United States Patent
Dreyer

(10) Patent No.: US 12,378,813 B2
(45) Date of Patent: Aug. 5, 2025

(54) REVOLVING DOOR FOR PROVIDING A PASSAGE WAY THROUGH A BUILDING WALL AND A METHOD OF OPERATING THE REVOLVING DOOR

(71) Applicant: Assa Abloy Entrance Systems AB, Landskrona (SE)

(72) Inventor: Roger Dreyer, Bjarred (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

(21) Appl. No.: 18/729,392

(22) PCT Filed: Jan. 19, 2023

(86) PCT No.: PCT/EP2023/051218
§ 371 (c)(1),
(2) Date: Jul. 16, 2024

(87) PCT Pub. No.: WO2023/139158
PCT Pub. Date: Jul. 27, 2023

(65) Prior Publication Data
US 2025/0101797 A1 Mar. 27, 2025

(30) Foreign Application Priority Data
Jan. 20, 2022 (SE) .................................... 2230013-1

(51) Int. Cl.
*E06B 3/90* (2006.01)
*E06B 7/21* (2006.01)

(52) U.S. Cl.
CPC . *E06B 3/90* (2013.01); *E06B 7/21* (2013.01)

(58) Field of Classification Search
CPC . E06B 3/90; E06B 3/906; E06B 3/903; E06B 11/08; E06B 7/21; E05F 15/608; E05F 15/02
(Continued)

(56) References Cited

U.S. PATENT DOCUMENTS 596,029 A * 12/1897 Ife .............................. E06B 3/90 49/505
1,007,025 A * 10/1911 Ely ........................... E06B 3/90 49/45
(Continued)

FOREIGN PATENT DOCUMENTS

| | | |
|---|---|---|
| JP | 5389739 | 7/1978 |
| JP | 2006045786 | 2/2006 |
| WO | 9828514 | 7/1998 |

OTHER PUBLICATIONS

Written Opinion and International Search Report for PCT/EP2023/051218, completed Apr. 12, 2023.
(Continued)

*Primary Examiner* — Justin B Rephann
(74) *Attorney, Agent, or Firm* — Wissing Miller LLP

(57) ABSTRACT

ASSA ABLOY Entrance Systems AB has developed a revolving door (1) for providing a passage way through abuilding wall (2), the revolving door (1) comprising: a wall structure (3) arranged in the building wall (2), the wall structure (3) comprising a first side wall section (8), a second side wall section (9), a floor section (10) and a ceiling section (11); a rotational arrangement (4) arranged in the centre of the wall structure (3); a number N door leafs (5*a*, 5*b*, 5*c*, 5*d*) attached to the rotational arrangement (4), the door leafs (5*a*, 5*b*, 5*c*, 5*d*) each having a peripheral edge (50) along an upper edge (100), an outer lateral edge (130) and a bottom edge (110), wherein the door leafs (5*a*, 5*b*, 5*c*, 5*d*) are arranged to create N compartments (16) in a circular area where the circumference is defined by the outer wall structure (3) and the peripheral lateral edge of the door leafs (5*a*, 5*b*, 5*c*, 5*d*) when rotated; wherein the revolving door is characterized in that at least part of the peripheral edge (50) has a retractable sealing (500) arranged to seal the gap between each door leaf and any section of the wall structure
(Continued)

Figure 1A:
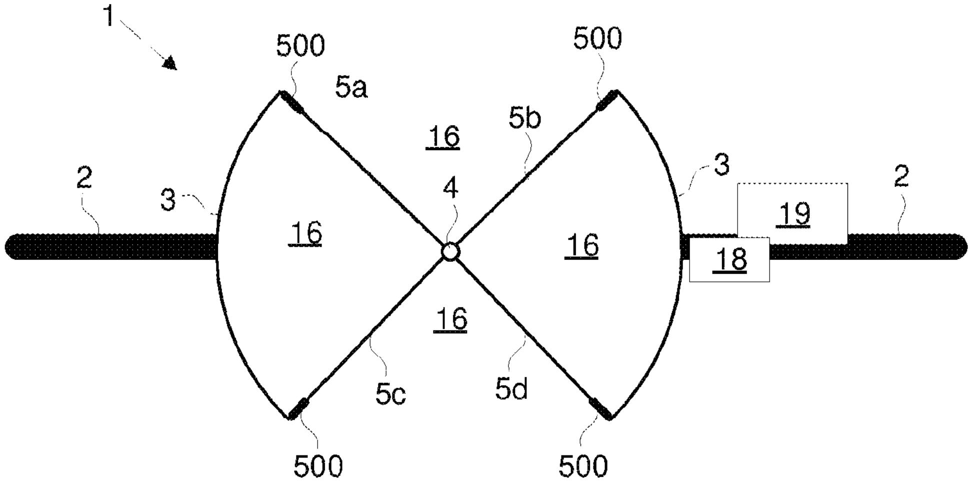

(3) adjacent to the at least part of the peripheral edge (50), the sealing (500) being arranged to be retracted when the door leafs (5*a,* 5*b,* 5*c,* 5*d*) are rotated and being arranged to be extractable when the door leafs (5*a,* 5*b,* 5*c,* 5*d*) are not rotated. The disclosure further relates to a method of operating the revolving door (1).

13 Claims, 3 Drawing Sheets

(58) Field of Classification Search
USPC .............................................................. 49/42
See application file for complete search history.

(56) References Cited

U.S. PATENT DOCUMENTS

| | | | | |
|---|---|---|---|---|
| 1,417,372 | A * | 5/1922 | Friedland | E06B 3/90 49/208 |
| 1,740,572 | A | 12/1929 | Camfield | |
| 1,947,845 | A | 2/1934 | Harry | |
| 5,339,881 | A * | 8/1994 | Owens | E06B 7/18 49/411 |
| 5,467,559 | A * | 11/1995 | Owens | E06B 7/2316 160/40 |
| 5,577,348 | A * | 11/1996 | Keller | E06B 7/2318 160/40 |
| 6,061,960 | A * | 5/2000 | Korai | E06B 3/90 49/42 |
| 6,167,937 | B1 * | 1/2001 | Williams | E06B 7/215 160/40 |
| 6,742,301 | B1 * | 6/2004 | Schwarz | E05G 5/003 49/42 |
| 7,104,008 | B2 * | 9/2006 | Yokotachi | E06B 3/90 49/40 |
| 10,287,817 | B2 * | 5/2019 | Jones | E05D 15/0652 |
| 2005/0121939 | A1 * | 6/2005 | Griffis | E06B 7/21 296/146.4 |
| 2008/0016772 | A1 | 1/2008 | Rockenbach | |

OTHER PUBLICATIONS

Swedish Search Report for application No. 2230013-1, dated Jan. 20, 2022.

* cited by examiner

REVOLVING DOOR FOR PROVIDING A PASSAGE WAY THROUGH A BUILDING WALL AND A METHOD OF OPERATING THE REVOLVING DOOR

This application is a 371 of PCT/EP2023/051218, filed on Jan. 19, 2023, published on Jul. 27, 2023, under publication number WO 2023/139158, which claims priority benefits from Swedish Patent Application No. 2230013-1, filed on Jan. 20, 2022, the disclosure of each of which are incorporated herein by reference.

TECHNICAL FIELD

The present disclosure relates to a revolving door for providing a passage way through a building wall and a method of operating the revolving door. More specifically, the disclosure relates to a revolving door for providing a passage way through a building wall and a method of operating the revolving door as defined in the introductory parts of the independent claims.

BACKGROUND ART

Rotating doors are widely used as entrance system in buildings. To avoid leakage of air from the building, especially when large temperature differences are present between the inside and outside of the building, rotating doors are provided with a sealing between the door leaf or door leafs and the opening in the building. This sealing is normally a brush.

The sealing on rotating doors wears down due to the friction between the sealing and the door hole. Debris caught in the brushes also scratch and damage glass and aluminum of the door hole. When the sealing is worn its function is reduced and leakage of air occurs. At some point the sealing has to be replaced, which induces costs and service work requirements which is costly and disturb the operation of the door.

When the sealing is new, it has a good sealing capacity, but instead invokes a friction that has to be overcome by the drive system of the door which increases the energy used for rotating the door.

There are thus problems with sealing rotating doors that would benefit from better solutions.

SUMMARY

It is an object of the present disclosure to mitigate, alleviate or eliminate one or more of the above-identified deficiencies and disadvantages in the prior art and solve at least the above mentioned problem. According to a first aspect there is provided a revolving door for providing a passage way through a building wall, the revolving door comprising: a wall structure arranged in the building wall, the wall structure comprising a first side wall section, a second side wall section, a floor section and a ceiling section; a rotational arrangement arranged in the centre of the wall structure; a number N door leafs attached to the rotational arrangement, the door leafs each having a peripheral edge along an upper edge, an outer lateral edge and a bottom edge, wherein the door leafs are arranged to create N compartments in a circular area where the circumference is defined by the outer wall structure and the peripheral lateral edge of the door leafs when rotated; wherein the revolving door is characterized in that at least part of the peripheral edge has a retractable sealing arranged to seal the gap between each door leaf and any section of the wall structure adjacent to the at least part of the peripheral edge, the sealing being arranged to be retracted when the door leafs are rotated and being arranged to be extractable when the door leafs are not rotated.

The above solution will reduce the friction invoked by the door sealing to zero. The sealing will thereby not be worn due to rotation of the door. The above invention utilize the fact that a rotating door is infiltrating much more air than what can be leaked around the sealed edges of the door leafs during rotation. In other word, a rotating door will in some sense function as a slow moving propeller moving air from the outside into the building and vice versa which is of a much bigger magnitude than what is leaked around the edges during rotation. The sealing of rotating doors is mainly there for when the door is not rotating and the door is supposed to be a barrier between the outside and inside of the building. The herein disclosed solution reduces air leakage and reduced rotational friction which reduces the power consumption. Swirling dust inside the revolving door due brushes swiping the floor is also reduced or completely avoided. No scratches on glass and aluminum occurs due to debris in the brushes that slides along the peripherals. The problems of the prior art are thereby solved.

The rotational arrangement of the revolving door may be a central shaft or a floor disk and/or ceiling disk covering the entire diameter of the revolving door.

According to some embodiments, the retractable sealing has an outer lateral sealing part arranged at the outer lateral edge of the door leafs. As the lateral edge normally is the longest edge of the door leaf, it is important for reducing air leakage when the door is not rotating. Depending on the rotational arrangement of the revolving door the lateral edge may also be the only edge in need of sealing.

According to some embodiments, the retractable sealing has an upper sealing part arranged at the upper edge of the door leafs. This is an advantage when the rotational arrangement is e.g. a central shaft so that the door leafs have an upper and a lower edge moving in relation to the ceiling and the floor, respectively.

According to some embodiments, the retractable sealing has an bottom sealing part arranged at the bottom edge of the doors leaf. This is an advantage when the rotational arrangement is e.g. a central shaft so that the door leafs have an upper and a lower edge moving in relation to the ceiling and the floor, respectively.

According to some embodiments, the rotational arrangement is arranged to be driven by at least one motor so that the door does not need to be pushed by users of the revolving door.

According to some embodiments, the revolving door comprises at least one retraction mechanism for retracting and extracting the retractable sealing and a control unit in communication with the motor, the control unit being adapted to control the retraction of the retractable sealing based on a signal from the motor so that the retractable sealing is retracted when the motor is engaged for rotating the rotational arrangement and so that the retractable sealing is extracted when the motor is off or disengaged. The retractable sealing is thereby retracted when motor is engaged and the revolving door is rotating.

According to some embodiments, the retraction mechanism is electrical, hydraulic, pneumatic, mechanical, or electro mechanical.

According to some embodiments, the revolving comprises a sensor arranged to sense rotation of the revolving door; at least one retraction mechanism for retracting and extracting the retractable sealing; and a control unit in communication with the sensor, the control unit being adapted to control the retraction of the retractable sealing based on a signal from the sensor so that the retractable sealing is retracted when rotation of the revolving door is detected and so that the retractable sealing is extracted when rotation of the revolving door is not detected. The retractable sealing is thereby retracted only when the revolving door is rotating.

According to some embodiments, the retractable sealing is comprised in the group consisting of a brush, a resilient sheet, an expandable seal, a shrinkable seal.

According to some embodiments, the retractable sealing is retracted into a frame arranged at the peripheral edge. According to some embodiments, the retractable sealing is retracted by pivoting the retractable sealing around a hinge arranged at the peripheral edge.

According to some embodiments, the retractable sealing is a shrinkable seal, wherein the retractable sealing is retracted by vacuum pumping the shrinkable seal.

These examples provide the function that the retractable sealing can be retracted when the revolving door is rotating and extracted when the revolving door is rotating thereby accomplishing a solution to all the problems of prior art solution discussed in the background section.

According to a second aspect there is provided a method of operating the revolving door according to the first aspect, the method comprising: retracting the retractable sealing of each door leaf and rotating the revolving door. Wear of the sealing and of the walls of revolving door is thereby avoided. Friction is also reduced saving energy.

According to some embodiments, the method further comprises: stopping the revolving door; and extracting the retractable sealing of each door leaf to seal the gap between door leafs. A good sealing is thereby achieved with a sealing that is less worn per time compared to prior art solutions.

According to some embodiments, the method further comprises: stopping the revolving door; receiving temperature information regarding the temperature on one or both sides of the building wall; extracting the retractable sealing or part of the retractable sealing of each door leaf to seal the gap between door leafs fully or partly based on the received temperature information. The sealing may e.g. not be used when there is a negligible temperature difference between outside and inside environments of the building.

The extraction of the extractable sealing may further be controlled based on information from the ventilation system. E.g. if cool air is needed when the current temperature is lower outside the building, the retractable sealing may not be extracted fully or immediately when the revolving door stops.

Effects and features of the second aspect are to a large extent analogous to those described above in connection with the first aspect. Embodiments mentioned in relation to the first aspect are largely compatible with the second aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 1*a* shows a schematic top view of a revolving door according to an embodiment of the present disclosure.

Figure 1B:
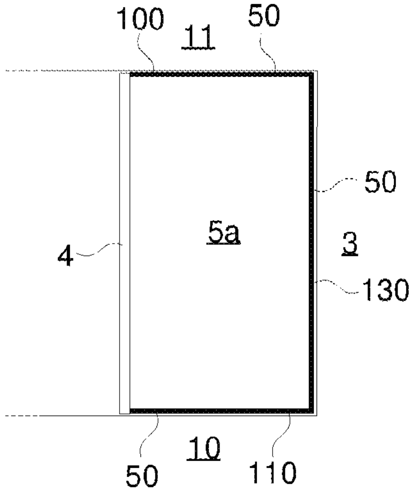

FIG. 1*b* shows a door leaf of the revolving door of FIG. 1*a*.

Figure 2A:
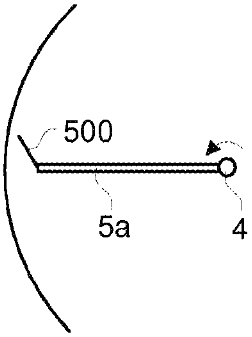

FIG. 2*a* shows a door leaf of the revolving door of FIG. 1 during rotation. The figure further shows a part of the wall structure surrounding the revolving door and a retracted sealing.

Figure 2B:
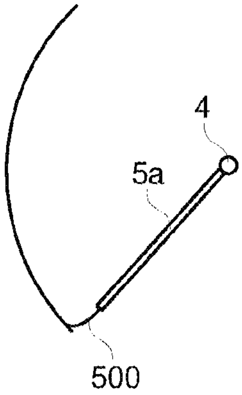

FIG. 2*b* shows the door leaf of FIG. 2*a* when the revolving door is not rotating and the sealing is not retracted.

Figure 2C:
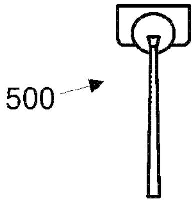

FIG. 2*c* shows an embodiment where the retractable sealing is retractable by pivoting the retractable sealing around a hinge. The retractable sealing is not retracted.

Figure 2D:
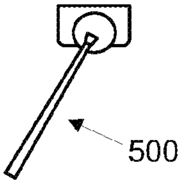

FIG. 2*d* shows the retractable sealing of FIG. 2*c* where the retractable sealing is pivoted around the hinge and thereby retracted.

Figure 2E:
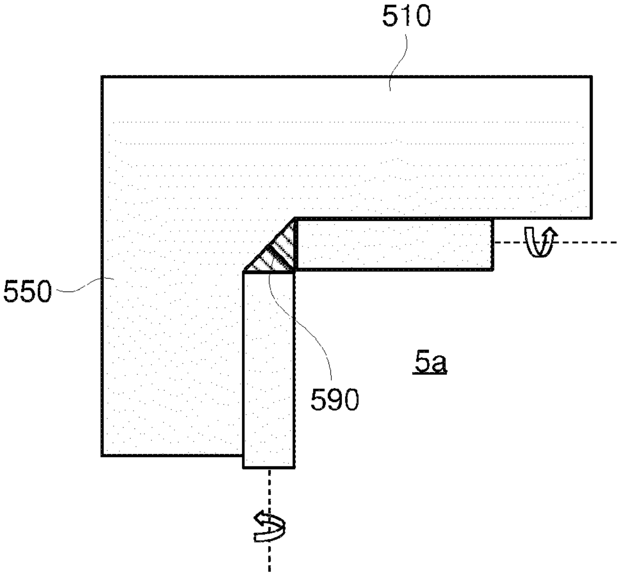

FIG. 2*e* shows the retractable sealing of FIGS. 2*c* and 2*d* and how it is arranged in a corner of the door leaf.

Figure 3A:
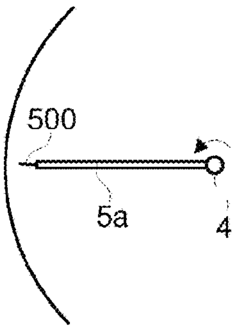

FIG. 3*a* shows a door leaf of the revolving door of FIG. 1 during rotation. The figure further shows a part of the wall structure surrounding the revolving door and a retracted sealing.

Figure 3B:
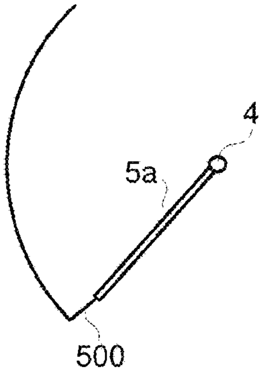

FIG. 3*b* shows the door leaf of FIG. 3*a* when the revolving door is not rotating and the sealing is not retracted.

Figure 3C:
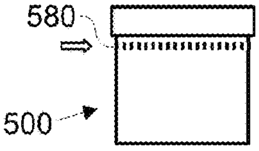

FIG. 3*c* shows an embodiment where the retractable sealing is retractable by leaning the retractable sealing using a comb or raster. The retractable sealing is not retracted.

Figure 3D:
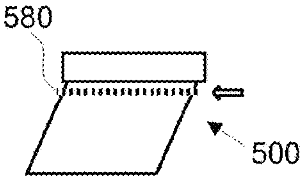

FIG. 3*d* shows the retractable sealing of FIG. 3*c* where the retractable sealing is retracted.

Figure 3E:
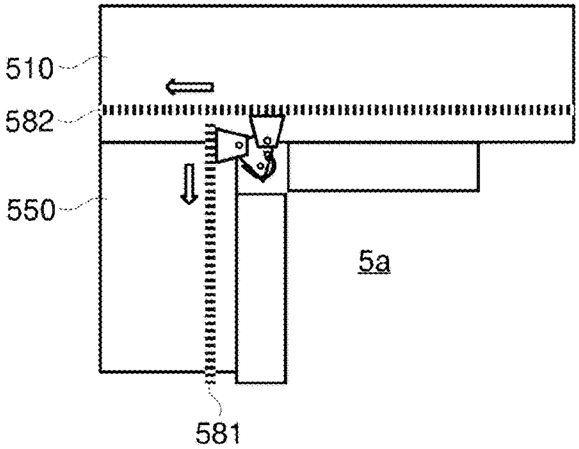

FIG. 3*e* shows the retractable sealing of FIGS. 3*c* and 3*d* and how it is arranged in a corner of the door leaf.

Figure 4A:
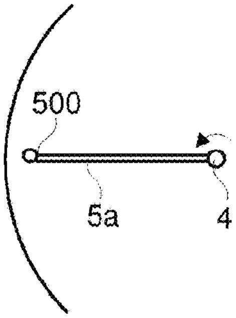

FIG. 4*a* shows a door leaf of the revolving door of FIG. 1 during rotation. The figure further shows a part of the wall structure surrounding the revolving door and a retracted sealing.

Figure 4B:
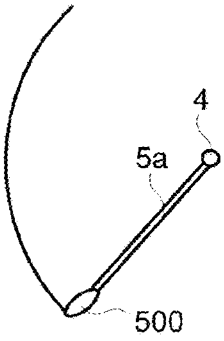

FIG. 4*b* shows the door leaf of FIG. 4*a* when the revolving door is not rotating and the sealing is not retracted.

Figure 4C:
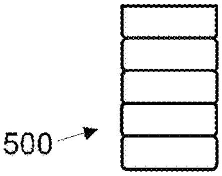

FIG. 4*c* shows an embodiment where the retractable sealing is retractable by changing the size of the sealing using fluid pressure. The retractable sealing is not retracted.

Figure 4D:
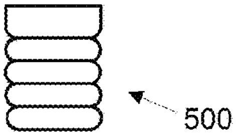

FIG. 4*d* shows the retractable sealing of FIG. 4*c* where the retractable sealing is retracted.

Figure 4E:
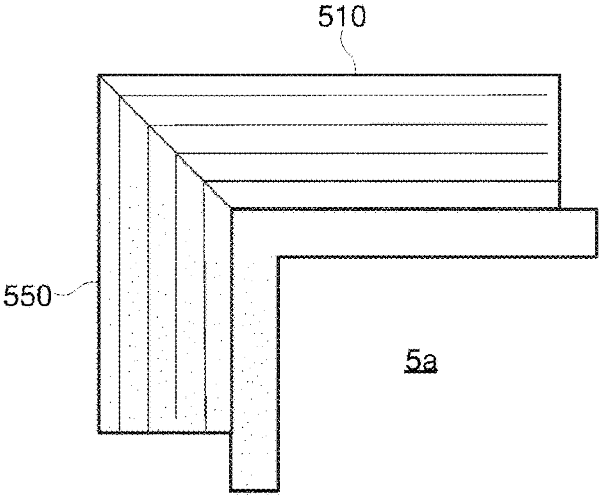

FIG. 4*e* shows the retractable sealing of FIGS. 4*c* and 4*d* and how it is arranged in a corner of the door leaf.

Figure 5A:
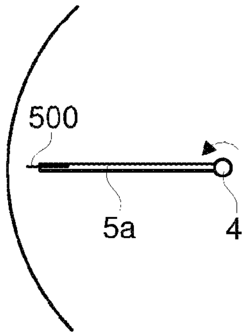

FIG. 5*a* shows a door leaf of the revolving door of FIG. 1 during rotation. The figure further shows a part of the wall structure surrounding the revolving door and a retracted sealing.

Figure 5B:
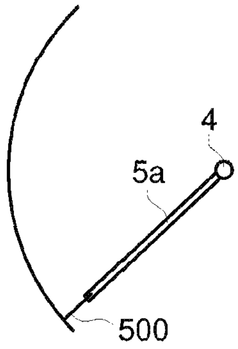

FIG. 5*b* shows the door leaf of FIG. 5*b* when the revolving door is not rotating and the sealing is not retracted.

Figure 5C:
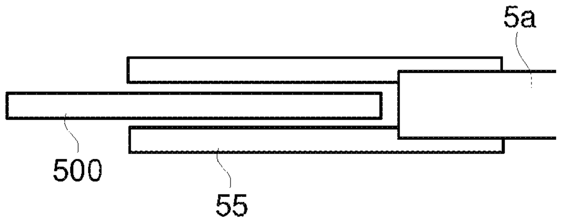

FIG. 5*c* shows an embodiment where the retractable sealing is retractable by changing moving the sealing into a frame. The retractable sealing is retracted.

Figure 6:
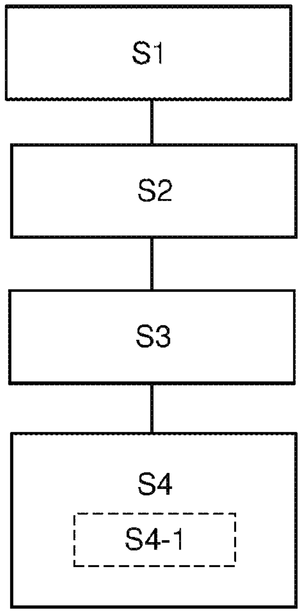

FIG. 6 is a flow chart representing the method according to an embodiment of the present disclosure.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

FIGS. 1*a* and 1*b* an embodiment of the first aspect of this disclosure with a revolving door 1 for providing a passage way through a building wall 2, the revolving door 1 comprising: a wall structure 3 arranged in the building wall 2, the wall structure 3 comprising a first side wall section 8, a second side wall section 9, a floor section 10 and a ceiling section 11; a rotational arrangement 4 arranged in the centre of the wall structure 3; a number N door leafs 5*a*,5*b*,5*c*,5*d* attached to the rotational arrangement 4, the door leafs 5*a*,5*b*,5*c*,5*d* each having a peripheral edge 50 along an upper edge 100, an outer lateral edge 130 and a bottom edge 110, wherein the door leafs 5*a*,5*b*,5*c*,5*d* are arranged to create N compartments 16 in a circular area where the circumference is defined by the outer wall structure 3 and the peripheral lateral edge of the door leafs 5*a*,5*b*,5*c*,5*d* when rotated; wherein the revolving door is characterized in that at least part of the peripheral edge 50 has a retractable sealing 500 arranged to seal the gap between each door leaf and any section of the wall structure 3 adjacent to the at least part of the peripheral edge 50, the sealing 500 being arranged to be retracted when the door leafs 5*a*,5*b*,5*c*,5*d* are rotated and being arranged to be extractable when the door leafs 5*a*,5*b*,5*c*,5*d* are not rotated as depicted in FIG. 1*a*. FIG. 1*b* depicts only one door leaf in the door hole of the wall structure.

As discussed in detail below the retractable sealing can be utilized in many ways. It can consist of a brush, a resilient sheet (e.g. rubber), an expandable seal, (e.g. pressurized by gas or any fluid), a shrinkable seal (e.g. vacuum pumped).

FIG. 2*a* shows the door leaf 5*a* of the revolving door 1 of FIG. 1 during rotation. The retractable sealing is retracted by pivoting the retractable sealing 500 around a hinge arranged at the peripheral edge 50. FIG. 2*b* shows the door leaf 5*a* of FIG. 2*a* when the revolving door is not rotating and the sealing is not retracted.

FIG. 2*c* shows an embodiment where the retractable sealing is retractable by pivoting the retractable sealing around a hinge. The retractable sealing is not retracted. FIG. 2*d* shows the retractable sealing 500 of FIG. 2*c* where the retractable sealing is pivoted around the hinge and thereby retracted.

FIG. 2*e* shows the retractable sealing 500 of FIGS. 2*c* and 2*d* and how it is arranged in a corner of the door leaf 5*a*. The outer lateral sealing part 550 of the retractable sealing 500 is arranged at the outer lateral edge 30 of the door leafs 5*a*,5*b*,5*c*,5*d*. An upper sealing part 510 of the retractable sealing 500 is arranged at the upper edge 100 of the door leafs 5*a*,5*b*,5*c*,5*d*. In FIG. 2*e* the outer lateral sealing part 550 is rotated counter clockwise (seen from below) and the upper sealing part 510 is rotated clockwise. This results in that the outer lateral sealing part 550 is rotated in the opposite direction than the upper sealing part 510 in relation to the door leaf surface 5*a*. The outer lateral sealing part 550 and the upper sealing part 510 can thereby be cut to abut to each other along the diagonal axis 590 in the corner without interfering each other when rotated. The retractable sealing 500 also has an bottom sealing part 511 (not shown) arranged at the bottom edge 100 of the doors leaf 5*a*,5*b*,5*c*,5*d* in a corresponding way as the upper sealing part 510 so that the corner can be correspondingly arranged.

FIG. 3*a* shows the door leaf 5*a* of the revolving door 1 of FIG. 1 during rotation. The retractable sealing is arranged at the peripheral edge 50 and arranged as a brush which is retracted by moving the comb or raster so that the brush bristles leans in one direction. FIG. 3*b* shows the door leaf 5*a* of FIG. 3*a* when the revolving door is not rotating and the sealing is not retracted, i.e. the comb 580 allows the brush bristle to extend perpendicular to the edge of the door leaf.

FIG. 3*c* shows an embodiment where the retractable sealing is retractable by leaning brush brittles. The retractable sealing is not retracted. FIG. 3*d* shows the retractable sealing 500 of FIG. 3*c* where the brush bristles are leaned. The retractable sealing is thereby retracted.

FIG. 3*e* shows the retractable sealing 500 of FIGS. 3*c* and 3*d* and how it is arranged in a corner of the door leaf 5*a*. The outer lateral sealing part 550 of the retractable sealing 500 is arranged at the outer lateral edge 30 of the door leafs 5*a*,5*b*,5*c*,5*d*. An upper sealing part 510 of the retractable sealing 500 is arranged at the upper edge 100 of the door leafs 5*a*,5*b*,5*c*,5*d*. In FIG. 3*e* the bristles of outer lateral sealing part 550 are leaned down by the comb 581 and the bristles of the upper sealing part 510 are leaned to the left. The outer lateral sealing part 550 and the upper sealing part 510 can thereby be cut to abut to each other along the upper edge 100 without interfering each other when retracted. The retractable sealing 500 also has an bottom sealing part 511 (not shown) arranged at the bottom edge 100 of the doors leaf 5*a*,5*b*,5*c*,5*d* in a corresponding way as the upper sealing part 510 so that the corner can be correspondingly arranged.

FIG. 4*a* shows the door leaf 5*a* of the revolving door 1 of FIG. 1 during rotation. The retractable sealing is retracted by shrinking the retractable sealing 500 e.g. by pumping vacuum in a rubber sealing or by removing a fluid so that he sealing shrinks. FIG. 4*b* shows the door leaf 5*a* of FIG. 4*a* when the revolving door is not rotating and the sealing is not retracted, i.e. the retractable sealing is full with fluid. The fluid could be any suitable liquid or gas. An advantage with using a gas is that a leaking sealing with cause less problems.

FIG. 4*c* shows an embodiment where the retractable sealing is retractable by shrinking the retractable sealing. The retractable sealing is not retracted. FIG. 4*d* shows the retractable sealing 500 of FIG. 4*c* where the retractable sealing is shrunk and thereby retracted.

FIG. 4*e* shows the retractable sealing 500 of FIGS. 4*c* and 4*d* and how it is arranged in a corner of the door leaf 5*a*.

In the same way as discussed in connection to FIGS. 4*a*-4*e* the retractable sealing 500 is a expendable seal, wherein the retractable sealing 500 is retracted by not expanding the seal. It could thus be a reverse solution to the one in FIGS. 4*a*-4*e* where the retractable sealing is extracted by filling a rubber sealing with fluid and releasing the fluid pressure when the door is rotated.

FIG. 5*a* shows a door leaf of the revolving door of FIG. 1 during rotation. The figure further shows a part of the wall structure surrounding the revolving door and a retracted sealing. FIG. 5*b* shows the door leaf of FIG. 5*b* when the revolving door is not rotating and the sealing is not retracted. FIG. 5*c* shows an embodiment where the retractable sealing

500 is retractable by moving the retractable sealing into a frame 55 arranged at the peripheral edge 50. The retractable sealing 500 is in a retracted position as shown in FIG. 5*a.*

With reference to all figures the rotational arrangement 4 is arranged to be driven by at least one motor (not shown). The revolving also comprises at least one retraction mechanism for retracting and extracting the retractable sealing 500. The retraction mechanism is different depending on the type of retractable sealing used as indicated in the Figures. The retraction mechanism is electrical, hydraulic, pneumatic, mechanical, or electro mechanical.

The revolving door 1 further comprises control unit 19 in communication with the motor, the control unit 19 being adapted to control the retraction of the retractable sealing 500 based on a signal from the motor so that the retractable sealing 500 is retracted when the motor is engaged for rotating the rotational arrangement 4 and so that the retractable sealing 500 is extracted when the motor is off or disengaged.

In some embodiments the revolving comprises a sensor 18 arranged to sense rotation of the revolving door 1; at least one retraction mechanism for retracting and extracting the retractable sealing 500; and a control unit 19 in communication with the sensor, the control unit 19 being adapted to control the retraction of the retractable sealing 500 based on a signal from the sensor so that the retractable sealing 500 is retracted when rotation of the revolving door 1 is detected and so that the retractable sealing 500 is extracted when rotation of the revolving door 1 is not detected.

FIG. 6 discloses a flow chart representing the second aspect of this disclosure which is a method of operating the revolving door 1 according to the first aspect. The method comprises: retracting S1 the retractable sealing 500 of each door leaf 5*a*,5*b*,5*c*,5*d*; and rotating S2 the revolving door 1. The method further comprises stopping S3 the revolving door 1; and extracting S4 the retractable sealing 500 of each door leaf 5*a*,5*b*,5*c*,5*d* to seal the gap between door leafs 5*a*,5*b*,5*c*,5*d.*

The method may optionally further comprise stopping S3 the revolving door 1; receiving temperature information regarding the temperature on one or both sides of the building wall 2; extracting S4-1 the retractable sealing 500 or part of the retractable sealing 500 of each door leaf 5*a*,5*b*,5*c*,5*d* to seal the gap between door leafs 5*a*,5*b*,5*c*,5*d* fully or partly based on the received temperature information. E.g. if cool air is needed when the current temperature is lower outside the building, the retractable sealing may not be extracted fully or immediately when the revolving door stops.

The person skilled in the art realizes that the present disclosure is not limited to the preferred embodiments described above. The person skilled in the art further realizes that modifications and variations are possible within the scope of the appended claims. For example, the solutions for accomplishing the retraction of the sealing are only a number of examples. A person skilled in the art realizes that further solutions or variations could be used under the scope of the invention. Additionally, variations to the disclosed embodiments can be understood and effected by the skilled person in practicing the claimed disclosure, from a study of the drawings, the disclosure, and the appended claims.

The invention claimed is:

1. A revolving door for providing a passage way through a building wall, the revolving door comprising:

a wall structure arranged in the building wall, the wall structure comprising a first side wall section, a second side wall section, a floor section and a ceiling section;

a rotational arrangement arranged in the centre of the wall structure;

a number N door leafs attached to the rotational arrangement, the door leafs each having a peripheral edge along an upper edge, an outer lateral edge and a bottom edge, wherein the door leafs are arranged to create N compartments in a circular area where the circumference is defined by the outer wall structure and the peripheral lateral edge of the door leafs when rotated;

wherein the revolving door is characterized in that at least part of the peripheral edge has a retractable sealing arranged to seal a gap between each door leaf and any section of the wall structure adjacent to the at least part of the peripheral edge, the sealing being arranged to be retracted when the door leafs are rotated and being arranged to be extractable when the door leafs are not rotated, further comprising:

at least one retraction mechanism for retracting and extracting the retractable sealing; and a control unit in communication with a motor, the control unit being adapted to control the retraction of the retractable sealing based on a signal from the motor so that the retractable sealing is retracted when the motor is engaged for rotating the rotational arrangement and so that the retractable sealing is extracted when the motor is off or disengaged.

2. The revolving door according to claim 1, wherein the retractable sealing has an outer lateral sealing part arranged at the outer lateral edge of the door leafs.

3. The revolving door according to claim 1, wherein the retractable sealing has an upper sealing part arranged at the upper edge of the door leafs.

4. The revolving door according to claim 1, wherein the retractable sealing has a bottom sealing part arranged at the bottom edge of the doors leaf.

5. The revolving door according to claim 1, wherein the retraction mechanism is electrical, hydraulic, pneumatic, mechanical, or electro mechanical.

6. The revolving door according claim 1, further comprising a sensor arranged to sense rotation of the revolving door, wherein the control unit is in communication with the sensor, the control unit being adapted to control the retraction of the retractable sealing based on a signal from the sensor so that the retractable sealing is retracted when rotation of the revolving door is detected and so that the retractable sealing is extracted when rotation of the revolving door is not detected.

7. The revolving door according to claim 1, wherein the retractable sealing is comprised in the group consisting of a brush, a resilient sheet, an expandable seal, and a shrinkable seal.

8. The revolving door according to claim 1, wherein the retractable sealing is retracted into a frame arranged at the peripheral edge.

9. The revolving door according to claim 1, wherein the retractable sealing is retracted by pivoting the retractable sealing around a hinge arranged at the peripheral edge.

10. The revolving door according to claim 1, wherein the retractable sealing is a shrinkable seal, wherein the retractable sealing is retracted by vacuum pumping the shrinkable seal.

11. A method of operating the revolving door according to claim 1, the method comprising:

retracting the retractable sealing of each door leaf; and rotating the revolving door.

12. The method according to claim 11, further comprising:

stopping the revolving door; and extracting the retractable sealing of each door leaf to seal the gap.

13. The method according to claim 11, further comprising:

stopping the revolving door;

receiving temperature information regarding the temperature on one or both sides of the building wall;

extracting the retractable sealing or part of the retractable sealing of each door leaf to seal the gap between door leafs fully or partly based on the received temperature information.

* * * * *